United States Patent [19]

Lewiner et al.

[11] Patent Number: 4,870,411

[45] Date of Patent: Sep. 26, 1989

[54] CODED LOCKING DEVICE, MORE ESPECIALLY WITH KEYBOARD

[76] Inventors: Jacques Lewiner, 5, rue Bory d'Arnex, 92210 Saint Cloud; Claude Hennion, 18, rue Flatters, 75008 Paris, both of France

[21] Appl. No.: 886,779

[22] Filed: Jul. 17, 1986

Related U.S. Application Data

[63] Continuation of Ser. No. 755,793, Jul. 17, 1985, abandoned.

[30] Foreign Application Priority Data

Jul. 20, 1984 [FR] France ................................ 81 11568

[51] Int. Cl.⁴ ................................................ H04Q 1/00

[52] U.S. Cl. ................................. 340/825.31; 70/278; 340/825.34

[58] Field of Search ..................... 235/382.5; 361/171, 361/172; 340/541, 542, 825.31, 825.32, 825.34; 70/315, 271, 277, 278

[56] References Cited

U.S. PATENT DOCUMENTS 3,796,889 3/1974 Fradkin et al. ................. 361/172 X 3,906,447 9/1975 Crafton ........................... 235/382.5

*Primary Examiner*—Ulysses Weldon

*Attorney, Agent, or Firm*—Larson and Taylor

[57] ABSTRACT

In a coded locking device, unlocking of which is controlled by composing any one of two separate codes, namely a code in use known by entitled users and a responsible person or "first code x" and a secret code or "second code y", able to be derived from the first code x by a particular law known only to the responsible person, the first composition of the second code y automatically ensures unlocking of the device and, in a way sufficiently postponed for the users to become acquainted with it, the three following operations: invalidation of the first code x, adoption by the device of the second code y as new first code, sensitization of the device to a third code z derived from the preceding second code y by the above low, this third code z serving as the new second code.

7 Claims, 1 Drawing Sheet

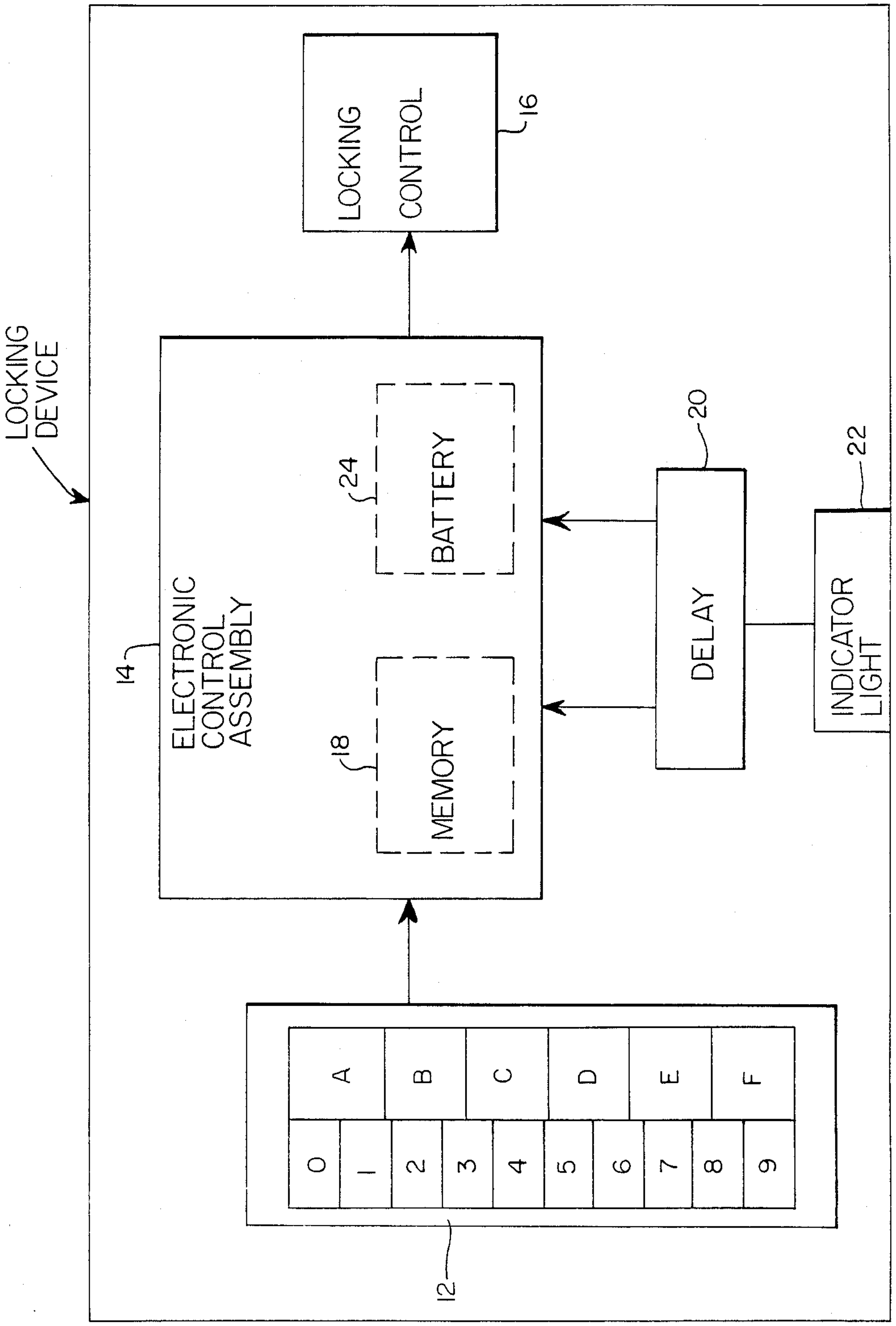
LOCKING DEVICE
LOCKING CONTROL
16
ELECTRONIC CONTROL ASSEMBLY
14
BATTERY
24
MEMORY
18
DELAY
20
INDICATOR LIGHT
22
A
B
C
D
E
F
0
1
2
3
4
5
6
7
8
9
12

CODED LOCKING DEVICE, MORE ESPECIALLY WITH KEYBOARD

This application is a continuation of application Ser. No. 755,793 filed 7/17/85 now abandoned.

The invention relates to coded locking devices, i.e. those whose unlocking requires the composition of a code.

In the present description, the word "unlocking" must be interpreted in the widest sense of granting permission accompanied or not by an appropriate command, such as freeing the access to premises, to a container or to information, issuing tickets, and so on.

It relates more especially to the case where the code is identifiable by a decimal number or the like (for example by a random succession of figures and letters) and may be translated by a succession of binary signals.

It relates more especially still, but not exclusively, among these locking devices of the kind considered, to those which are equipped with a control keyboard comprising a plurality of keys identified respectively by signals such as figures and letters: it is known that, for unlocking such device, it is sufficient to compose the code by pressing successively the keys of the keyboard corresponding to this code.

The safety of the locking provided by the devices considered, assumes that knowledge of the code remains reserved for a limited number of entitled users.

When the code comes to the knowledge of unentitled users, the safety of the locking is no longer ensured and such safety is re-established in general by changing the code, the new code only being given to the entitled users.

In known embodiments, such a change requires the visit by an approved specialist sent by a responsible body such as the firm who fitted the locking device.

Such a requirement is complicated, long and costly.

Moreover, it offers only a mediocre level of safety because the new code must be brought to the knowledge of the person making the one site change and each code inscribed on the device must be readily modifiable and so identifiable.

To make such a visit by a specialist unnecessary, it has already been proposed to adapt the locking devices of the above kind so that they are unlockable at any time by the composition of any one of two separate codes namely the code in use known by the entitled users at said time or a "first code x" and a code secret at said time or "second code y", derivable from the first code x by a special law or predetermined formula, this law being on the one hand known by the person responsible for the device and being on the other hand recorded in this device so that when said second code y is composed for the first time, in addition to unlocking of the device, the following three operations are automatically provided: invalidation of the first code x, adoption by the device of the second code y as new first code and sensitization of the device to a third code z derived from the preceding second code y by the above law of derivation, this third code z serving as the new second code.

Such an arrangement is satisfactory for locking devices in which the change of code may be effected immediately: this is the case when the user of the lock concerned is the only one, said lock being for example that of a hotel room; the code for opening such a lock then being changed when the occupant of said chamber changes in response to each newly coded key into said lock.

But such an immediate change of code is not acceptable for locking devices likely to be actuated by a plurality of entitled users, such as is the case for the lock controlling the door giving access to a block of flats or similar comprising a plurality of occupants.

In fact in such a case all the users of the code change to be made should be warned and have an "over-lap" period during which the old code remains still valid at the same time as the new code.

The essential aim of the invention is to provide such a momentary "overlap" of the two codes.

For this, in accordance with the invention, the three above operations are postponed in a predetermined way from the first time the second code y is composed.

In advantageous embodiments, recourse is further had to one and/or the other of the following arrangements:

the three operations initiated by the first composition of the second code y are postponed by a predetermined delay from this first composition, the three operations initiated by the first composition of the second code y are postponed from this first composition, until unlocking of the device has been carried out a predetermined number of times by composing any one of the codes x and y, means are provided, such as the illumination of an indicator light, for signalling to the user the "postponed code change" periods initiated by each first composition of the second code y.

Apart from these main arrangements the invention comprises certain other arrangements which are used preferably at the same time and which will be more explicitly discussed hereafter.

The single figure in the drawings is a highly schematic, block representation of a locking device in accordance with a preferred embodiment of the invention.

In what follows a preferred embodiment of the invention will be described in a way which is of course in no wise limited to a coded locking device with a keyboard. In the illustrated embodiment, the locking device, which is denoted 10, includes a keyboard 12; comprising a pattern of keys each identified by a numeral or by a letter. The locking device 10 also includes an electronic control assembly 14, a locking control mechanism 16, a memory 18 and a delay network 20.

By way of example, as illustrated, the keys of keyboard 12 may be 16 in number, the figures numerals being the whole of those integers between 0 and 9 and the letters A, B, C, D, E and F.

Unlocking such a device is only possible by an entitled user, i.e. one knowning the code, which code is here characterized by a succession of figures and/or letters such for example as 724B.

Such unlocking is provided by composing the code by successively pressing the corresponding keys of the keyboard 12, namely for the above example the keys 7, 2, 4 and B.

To change the code for unlocking the device, this device is made responsive each time to two codes, namely not only the code used that time or "first code x", but also a code which is secret at said time or a "second code y", this second code being derived from the first one by a predetermined law or formula.

This law is on the one hand known by the person responsible for the device, who may then determine the list of valid codes successively or such a list if several are possible.

Said law is moreover recorded the memory 18 in the device, or more precisely in the electronic control assembly 14 associated with this device, so that this latter is capable of automatically causing successive code changes, each change of code being initiated automatically by composing the next code on the list.

The recording in question is provided so that the composition of each "second code y" ensures the desired unlocking of the device and automatically initiates, in a deferred or postponed way, which will be described further on, the following three operations:

invalidation of the corresponding "first code x", replacement of this first code x by the second code y as subsequent normal unlocking code, sensitization of the device to a third code z derived from the second code y by the above law.

The law in question may be any of those capable of causing another number y or at least one of the different numbers y forming part of a well defined assembly to correspond to a number x, available preferably in binary form.

In a first variant, this law is an algorithm y=(x), i.e. a succession of digital operations causing a single and well defined binary number y to correspond to each binary number x.

In this case, the successively valid codes are x, f(x), $f^2(x)$, . . . , $f^n(x)$ . . .

In the preceding paragraph, n designates an integer, $f^n(x)$ signifies $f[f^{n-1}(x)]$and the symbol f(x) is equivalent to $f^1(x)$.

In a second variant, it is considered that each expression of the first code x is formed of two halves, namely a first half a and a second half b whose respective positions in said expression are well defined and the first half corresponding to the second code y is formed by the above half b, the second half c corresponding to this code y then automatically playing the role previously filled by the second half b in code x.

Thus, in the above example, it may be considered that the two halves a and b of code x are respectively 72 and 4B and so form a next code y by a new set of four symbols, the first two of which would be 4B, the other two symbols being any ones and chosen by the person responsible for the device, but becoming definitive as soon as they are composed for the first time on the keyboard following the first two symbols 4 and B.

Of course, such a solution cannot be considered in practice, for the law for deriving the successive codes would be immediately identifiable by the users knowing two such successive codes.

This is why, in the second variant considered, the two halves a and b are masked.

For this, in an advantageous approach, these two halves are formed by sampling the binary number corresponding to each code.

For the code 724B, this number is:
0111001001001011

The half a may be formed by the digits of uneven rank of this number 01010011 and half b by the digits of even rank 11001001.

On this assumption, a second code y could be obtained by shifting leftwards by one unit all the even digits of the binary number considered and by choosing any values for the new digits of even rank.

Thus, such a second code y could be, for the present example:

1011010010000110 which number corresponds to the symbol B486.

The sampling considered could of course be carried out in a more sophisticated way than the one given in the above example.

Thus, the set of binary units, of the above binary number, corresponding to ranks 1, 2, 5, 6, 9, 10, 13 and 14 of said number could be adopted as half a.

Sampling could also be carried out in an irregular way instead of one of the regular ways given as example above, the distribution of sampling being for example the succession of ranks 2, 3, 4, 6, 9, 10, 12 and 16.

It should be noted that with this second variant, each new code y is not completely determined beforehand depending on the preceding code x.

In fact, the "second half" c of said new code y - which comprises b as first half - is left to the choise of the person responsible for the locking device and only becomes definitive after the first effective composition of this new code y.

In another variant, based on the same principle, the law for deriving each code y from a code x expressed in binary number form consists in suppressing the first binary digit of this number, in shifting all its other units leftwards and replacing the last binary digit by a new one which may again be chosen by the responsible person.

For the example chosen above, that would mean adopting for code y one of the following two:
0110100100001100 or
0110100100001101 which correspond respectively to the symbols 690C and 690D.

As mentioned above, invalidation of the code in use is not effected immediately after the first composition of a new code, but postponed so that the users of the device are not taken unawares : the two codes considered thus remain valid simultaneously for a period during which the users are informed.

For this, delay means 20 are provided in the locking device for automatically postponing by a delay R, from the first composition of a new code, the invalidation of the code in use as well as the other two operations which are associated therewith.

Thus, if the locking device 10 is used to equip a door giving access to a block of flats, the delay R may be a day so that all the inhabitants of the block of flats may be warned of the change of code to be made.

In a variant, the delay R may be defined not by a period of time, but by a predetermined number N of compositions of the code in use and/or of the new code : thus, for the above mentioned application to the unlocking of the door of a block of flats, if the means number N of operations for opening this door is 100 per day, initiation of the three above operations may be postponed until such opening operations have been effected 100 times, using any one of the two codes, from the first composition of the new code.

In a particularly advantageous embodiment, signalling means, such for example as the lighting of an indicator light 22, are provided for informing the user that the locking device 10 is in its "postponed code change" period, which period is initiated by the first composition of a new code, so as to inform said user of the imminent change of the code or incite him to make enquiries if he does not know the new code.

In preferred constructions of the above locking devices, the successive codes are recorded in the electronic memory 18, for example a semiconductor memory, supplied by a safeguard battery 14 or adapted so that successive code recordings and deletions may be effected therein by electric control and so that the recorded codes are kept therein even in the absence of any electric power supply.

Following which, and whatever the embodiment adopted a coded locking device is finally obtained which lends itself in an extremely simple and flexible way to a code change.

In fact, for making such a code change, it is sufficient for the person responsible for the locking device to inform one of the entitled users of the new code to be adopted and for this user to compose this new code so that the device automatically adopts this latter code after a period of time for the users to become acquainted with it.

As is evident, and as it follows moreover already from what has gone before, the invention is in no wise limited to those modes of application and embodiments which have been more especially considered; it embraces, on the contrary, all variants thereof, particularly those in which the number of codes ($x_1$, $x_2$. . . ) normally in use at a given time or during a given period for actuating the locking device is greater than one, as is the case for locks actuable by two different day and night codes, or else for locks actuatable by codes graded for actuating respectively different numbers of locks and brought to the knowledge of users complying with different criteria of entitlement, each of these codes $x_1$, $x_2$ being able to be "changed" automatically on the spot by simply composing a "next code" ($y_1$, $y_2$) after a predetermined delay ($R_1$, $R_2$) following such composition of the number, the different delays considered being possibly different from one code to another.

We claim:

1. In a coded locking device comprising means for composing codes, and control means; including a memory, connected to said composing means for controlling an unlocking operation at any time responsive to the composing by said composing means of any one of two separate codes, namely a first code concurrently in use at the time of the unlocking operation and known by a plurality of entitled users at said time and by a responsible person and a second code y which is secret at said time and which is capable of being derived from the first code x in accordance with a predetermined law, this law being on the one hand known only by the person responsible for the device and being on the other hand recorded in said memory in the device, said control means including means responsive to the first composition of said second code y for automatically providing, in addition to unlocking of the device, the three following operations: invalidation of the first code x, adoption by the device of the second code y as new first code and sensitization of the device to a third code z derived from the preceding second code y in accordance with said predetermined law, this third code z serving as a new second code, the improvement comprising means connected to said control means for postponing said three operations in a predetermined way after the first composition of said second code y.

2. The locking device according to claim 1, wherein the means for postponing the three operations comprises delay means for delaying the three operations initiated by the first composition of the second code y for a predetermined period after this first composition.

3. The locking device according to claim 1, wherein the means for postponing the three operations provides that the three operations initiated by the first composition of the second code y are postponed, from this first composition, until unlocking of the device has been carried out a predetermined number of times by composing any one of the two codes x and y.

4. The locking device as claimed in claim 1, further comprising means for informing the use of "postponed code change" periods initiated by each first composition of a second code y.

5. The locking device according to claim 1, wherein successive codes are recorded in said memory so that successive code recordings and deletions may be effected therein by said control means and so that the recorded codes are in said memory even in the absence of any electric power supply.

6. The locking device according to claim 1 in which the number of codes normally in use at a given time or during a given period is greater than one, said control means including means for enabling said codes to be changed automatically on the spot by simply composing a next code after a predetermined delay, provided by the postponing means, and corresponding to that code, following such composition.

7. The locking device according to claim 6, wherein the different delays corresponding to the different codes differ from each other.

* * * * *

UNITED STATES PATENT AND TRADEMARK OFFICE
CERTIFICATE OF CORRECTION

PATENT NO. : 4,870,411

DATED : September 26, 1989

INVENTOR(S) : Lewiner et al

It is certified that error appears in the above-identified patent and that said Letters Patent is hereby corrected as shown below:

Title page: item [30] should read as follows:

[30] Foreign Application Priority Data

Jul. 20, 1984 [FR] France .........84 11568

Signed and Sealed this

Twenty-ninth Day of January, 1991

*Attest:*

HARRY F. MANBECK, JR.

*Attesting Officer* *Commissioner of Patents and Trademarks*